US008015357B2

(12) United States Patent
Strumper et al.

(10) Patent No.: US 8,015,357 B2
(45) Date of Patent: Sep. 6, 2011

(54) STORAGE ARRAY TILE SUPPORTING SYSTOLIC MOVEMENT OPERATIONS

(75) Inventors: Volker Strumper, Austin, TX (US); Matteo Frigo, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 12/270,186

(22) Filed: Nov. 13, 2008

(65) Prior Publication Data

US 2010/0122034 A1 May 13, 2010

(51) Int. Cl.
*G06F 12/00* (2006.01)
(52) U.S. Cl. ........................................................ 711/118
(58) Field of Classification Search .................. None
See application file for complete search history.

(56) References Cited

U.S. PATENT DOCUMENTS

| 5,355,345 A | 10/1994 | Dickinson et al. |
| 7,107,399 B2 | 9/2006 | Bilardi et al. |
| 2005/0114618 A1 | 5/2005 | Lu et al. |
| 2005/0132140 A1 | 6/2005 | Burger et al. |

OTHER PUBLICATIONS

Bilardi et al., "Optimal Organizations for Pipelined Hierarchical Memories", SPAA '02, Aug. 2002, p. 109-116, Winnipeg, Manitoba, Canada.
Kwon et al., "A Scalable Memory System Design", 10$^{th}$ International Conference on VLSI Design, Jan. 1997, p. 257-260.
Kim et al., "An Adaptive, Non-Uniform Cache Structure for Wire-Delay Dominated On-Chip Caches", ASPLOS X, Oct. 2002, p. 211-222, San Jose, CA.
Baer et al., "On the Inclusion Properties for Multi-Level Cache Hierarchies", IEEE, Feb. 1988, p. 73-80.
Dickinson et al., "A Systolic Architecture for High Speed Pipelined Memories", IEEE, 1993, p. 406-409.
Beckmann et al., "Managing Wire Delay in Large Chip-Multiprocessor Caches", 37th Annual IEEE/ACM International Symposium on Microarchitecture, Dec. 2004, p. 319-330, Portland, OR.
Chishti et al., "Distance Associativity for High-Performance Energy-Efficient Non-Uniform Cache Architectures", 36th Annual IEEE/ACM International Symposium on Microarchitecture, Dec. 2003, 55-66, San Diego, CA.
Dybdahl et al., "An Adaptive Shared/Private NUCA Cache Partitioning Scheme for Chip Multiprocessors", 13th International Symposium on High Performance Computer Architecture, Feb. 2007, p. 2-12, Phoenix, AZ.

(Continued)

*Primary Examiner* — Hiep T Nguyen
(74) *Attorney, Agent, or Firm* — Mitch Harris, Atty at Law, LLC; Andrew M. Harris; Libby Z.. Toub (57) ABSTRACT

A tile for use in a tiled storage array provides re-organization of values within the tile array without requiring sophisticated global control. The tiles operate to move a requested value to a front-most storage element of the tile array according to a global systolic clock. The previous occupant of the front-most location is moved or swapped backward according to the systolic clock, and the new occupant is moved forward according to the systolic clock, according to the operation of the tiles, while providing for multiple in-flight access requests within the tile array. The placement heuristic that moves the values is determined according to the position of the tiles within the array and the behavior of the tiles. The movement of the values can be performed via only next-neighbor connections of adjacent tiles within the tile array.

25 Claims, 9 Drawing Sheets

OTHER PUBLICATIONS

Foglia et al, "A NUCA Model for Embedded Systems Cache Design", 3rd IEEE Workshop on Embedded Systems for Real-Time Multimedia, Sep. 2005, p. 41-46, New York, NY.

Huh et al., "A NUCA Substrate for Flexible CMP Cache Sharing", International Conference on Supercomputing, Jun. 2005, p. 31-40, Boston, MA.

Muralimanohar et al., "Optimizing NUCA Organizations and Wiring Alternatives for Large Caches With CACTI 6.0", 40th Annual IEEE/ACM International Symposium on Microarchitecture, Dec. 2007, p. 3-14, Chicago, IL.

U.S. Appl. No. 12/264,682, filed Nov. 4, 2008, Li et al.

Abella et al., "Power Efficient Data Cache Designs", IEEE Computer Society, Oct. 2003, p. 3-8, San Jose, CA.

Gilbert et al., "Variable-Based Multi-Modual Data Caches for Clustered VLIW Processors", IEEE Computer Society, Sep. 2005, p. 3-13, St. Louis, MO.

Gonzales et al., "A Data Cache with Multiple Caching Strategies Tuned to Different Types of Locality", ACM, 1995, p. 338-347.

Lee et al., "Region-Based Caching: An Energy Delay Efficient Memory Architecture for Embedded Processors", CASES, 2000, p. 120-127.

Akioka, et al., "Ring data location prediction scheme for Non-Uniform Cache Architectures," *International Conference on Computer Design*, Piscataway 2008.

Jin, et al., "A Domain-Specific On-Chip Network Design for Large Scale Cache Systems," *13th International Symposium on High-Performance Computer Architecture (HPCA-13)*, Phoenix, 2007.

STORAGE ARRAY TILE SUPPORTING SYSTOLIC MOVEMENT OPERATIONS

CROSS-REFERENCE TO RELATED APPLICATIONS

The present Application is related to U.S. patent application Ser. No. 12/270,095, entitled "A SPIRAL CACHE MEMORY AND METHOD OF OPERATING A SPIRAL CACHE MEMORY" and filed contemporaneously herewith and published as U.S. Patent Application Publication 20100122025A1 on May 13, 2010, U.S. patent application Ser. No. 12/270,132, entitled "TILED STORAGE ARRAY WITH SYSTOLIC MOVE-TO-FRONT REORGANIZATION" filed contemporaneously herewith and published as U.S. Patent Application Publication 20100122057A1 on May 13, 2010, and U.S. patent application Ser. No. 12/270,249, entitled "SPIRAL CACHE POWER MANAGEMENT, ADAPTIVE SIZING AND INTERFACE OPERATIONS" filed contemporaneously herewith and published as U.S. Patent Application Publication 20100122031A1 on May 13, 2010. Each of the above-listed U.S. Patent Applications has at least one common inventor with the present application and is assigned to the same Assignee. The disclosures of all of the above-referenced U.S. Patent Applications are incorporated herein by reference.

BACKGROUND OF THE INVENTION

1. Field of the Invention

The present invention is related to cache memories, and more particularly to a storage array tile that supports systolic movement within a storage array.

2. Description of Related Art

In present-day cache memory systems, there is a trade-off between the time required to access most-frequently-accessed values, and the number of such values available at the shortest access times. For example, in a traditional multi-level cache hierarchy, the level-one (L1) cache provides a uniform access time for a particular number of values, and control circuits and other algorithmic features of some systems operate to maintain the most-frequently-accessed values within the L1 cache. However, due to physical wiring constraints and the fact that electronic systems are limited by the propagation speed of electronic signals, the larger the L1 cache, the longer the (fixed) access time for the typical L1 cache. Similarly, as the size of the L1 cache is reduced in order to reduce the access time, the number of frequently-accessed values that are not stored in the L1 cache increases. The values not stored in the L1 cache are therefore stored in higher-order levels of the memory hierarchy (e.g., the L2 cache), which provides a much greater penalty in access time than that provided by the L1 cache, as the typical cache memory system is inclusive, that is, higher-order levels of the memory hierarchy contain all values stored in the next lower-order level. For practical purposes, a given higher-order cache memory is generally much larger than the cache memory of the next lower order, and given the propagation speed constraints mentioned above, e.g., RC wire delay and the eventual limitation of the inherent speed of electric field propagation in die interconnects, the higher-order cache is much slower, typically on the order of 10-100 times slower than the next lower-order cache memory.

Further, the typical cache control algorithm employed in such cache memory systems typically handles one outstanding request to a cache level at a time. If an access request "misses" a cache, the access is either stalled or fails and must therefore be retried by the source of the request (e.g., a next lower-order numbered cache level or a processor memory access logic in the case of an L1 cache miss). The request is propagated away from the processor toward a higher-order level of cache memory, but retrying requests later at the L1 level ensures that access to the cache is still provided for other instructions that can execute while a hardware thread dependent on the requested value is waiting for the request to succeed. The alternative of stalling the entire processor pipeline is available, but provides an even more severe performance penalty.

Finally, the organization of values in a cache memory hierarchy is typically imposed by control structures within the cache memory hierarchy, e.g., cache controllers, that measure access frequencies according to schemes such as least-recently-used (LRU) and organize the levels of cache to maintain the most-frequently accessed values in the lower-order caches using cast-out logic.

Solutions other than the traditional cache memories and hierarchy described above have been proposed that permit multiple requests to be pipelined, but require the imposition of fixed worst-case access latencies and buffering to control the flow of the pipelined information. Further, non-traditional cache memories have been proposed that have a non-uniform access latency and that are organized without using additional access measurement and cast-out logic, but generally only offer a small potential improvement over the operation of present cache memories by swapping cache entries to slowly migrate frequently accessed values to "closer" locations, while migrating less frequently used values to "farther" locations. Such non-uniform cache memories also require additional pathways to perform the swapping and are typically routed systems, in which switching circuits are used to perform selection of a particular cache bank.

The above-incorporated U.S. Patent applications describe a memory array, in particular a novel spiral cache memory in which multiple requests can concurrently flow through the memory array tiles, moving requested values to a front-most tile. While such operation can be supported by a global control logic, such logic defeats to some degree the advantages of an easily replicable and scalable tiled design. Further, timing of global control to local element access times and wire interconnects always presents a challenge.

Therefore, it would be desirable to provide a storage tile that can support movement of values within storage arrays such as those described in the above-incorporated U.S. Patent applications to provide a replicable and scalable design that requires little global control support.

SUMMARY OF THE INVENTION

The invention is embodied in a storage array tile and its method of operation, as well as a storage array including such tiles. The tiles respond to incoming requests, data and a global systolic clock such that move-to-front and push-backward operations are supported in an array made of such tiles, without requiring sophisticated global control.

Each tile includes one or more storage locations for storing corresponding value(s) and a control logic that receives requests for a value (e.g., a data value or an instruction) containing associated identifiers (e.g., addresses). The control logic within the tile determines whether the value associated with the identifier is present within the one or more storage locations, populates the request if the value is present, sets an appropriate indication that the request is satisfied, and passes the data value along to an output. If the value is not present in the storage locations, the request is passed along to a second output, moving the request along to a next neighboring tile. The tile may also support move-backward operations by receiving values at an input, and storing the associated value if the one or more storage locations is empty. The tile may alternatively always store the associated value and swap a stored value backward in response to the received value if the one or more storage locations was not empty. The global systolic clock controls the move-to-front and move-backward operations such that both operations are supported in phases the global systolic clock, so that an entire array of the tiles can complete a move-to-front and move-backward (or swap backward) operation in a single duty cycle of the global systolic clock via connection to two separate networks, which may be defined by the direction of next-neighbor port connections. The tiles also alternatively may provide a single port for connection to a single network for performing the move-to-front and move-backward operations so that all operations can be performed in three or more phases of the global systolic clock.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention encompasses a novel tile for use in a memory array structure and a functionality of the tile that supports a systolic move-to-front operation causing the values in the memory array to be reorganized at each request to place the most-recently accessed value at the front-most central storage location, while moving other values backwards at each new access to a location other than the front-most central storage location. The present invention provides for arrays providing large and fast storage by dynamically moving values forward on a substantially continuous basis, without requiring global control logic to control the movement.

Architecture of a Spiral Cache A spiral cache formed by tiles according to an embodiment of the present invention, exploits the dimensionality of Euclidean space to reduce the worst-case access latency, and offers a systolic data flow capable of pipelining multiple accesses. In the following illustrative embodiment the storage cell associated with a tile of a spiral cache is itself an entire storage array. In general, an efficient tile design balances the size of the tile's array such that the propagation delay of the wires connecting neighboring tiles is equal to the access latency of the tile's array. One embodiment of the tiles includes a fast, direct-mapped cache within each tile, and uses a cache line as the unit of data transfer communicated between the tiles. In the present application, the memory within a tile is referred to as the memory array irrespective of the particular cache architecture and physical layout that are employed in the tiles. The tiles further provide movement functionality as described below according to a distributed control logic provided by control logic of the individual tiles.

Figure 1:
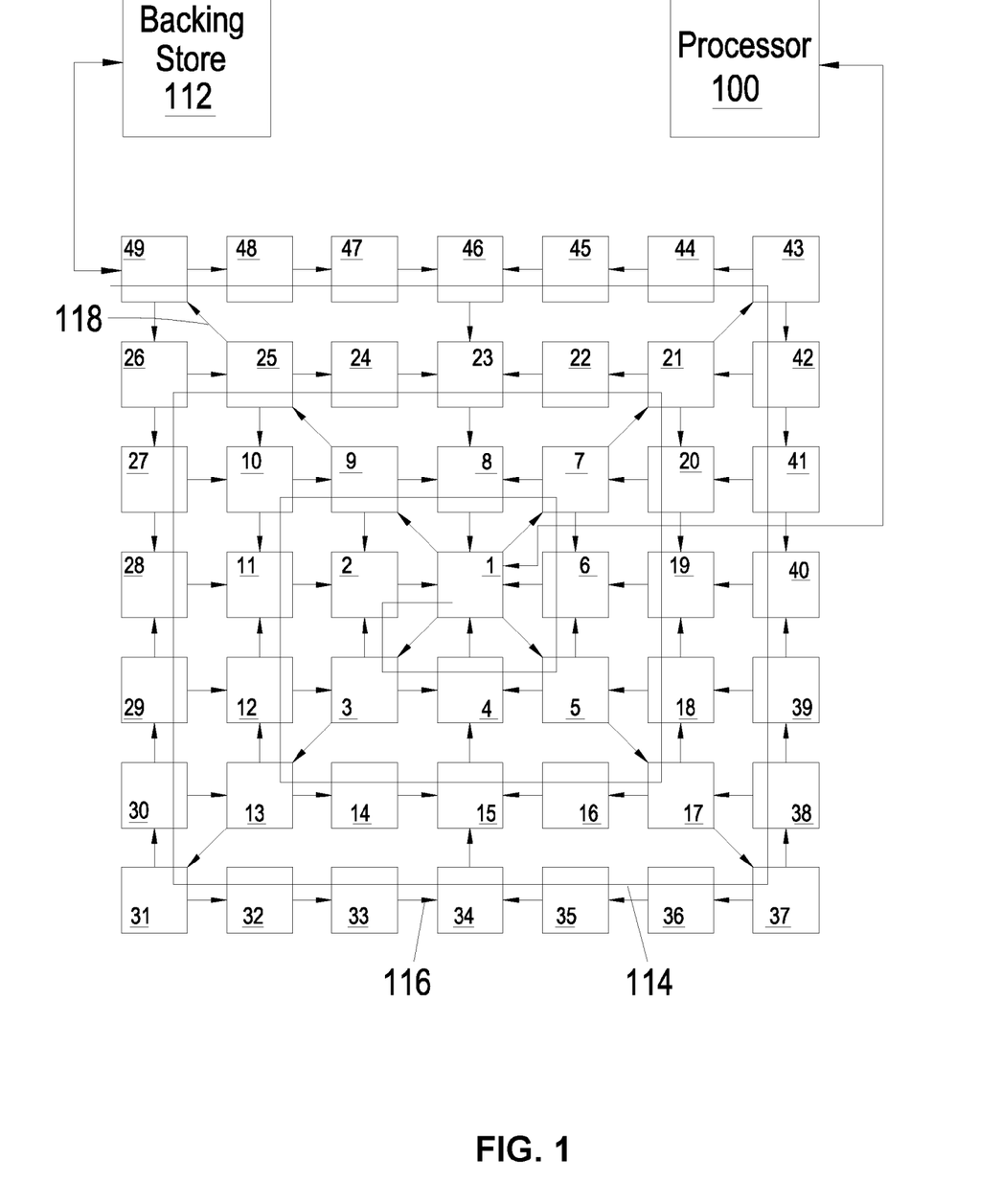
FIG. 1 is a block diagram of a tiled storage array according to an embodiment of the present invention implementing a spiral cache.

Basic Spiral Cache Architecture The basic architecture of a 2-dimensional spiral cache formed by tiles in accordance with an embodiment of the present invention is shown in FIG. 1. The spiral nature of the exemplary cache can be visualized as a "wrapping" of a linear array around tile 1, such that the linear array forms an Archimedes spiral with a Manhattan layout. A processor 100, lower-order level cache, or other data/instruction sink connects to the front end of the spiral at front-most tile 1. The tail end of the spiral, in the example at tile 49 of the 7×7 matrix of tiles, connects to a backing store 112, which may be a higher-order cache, system memory, disc storage or other data/instruction storage.

For the spiral cache illustrated in FIG. 1, the spiral network 114 of next neighbor connections is dedicated to the push-back operation. Doing so enables the spiral cache to move one new data item into front-most tile 1 during every systolic cycle, because a fully occupied spiral cache can perform one push-back swap of the contents of each storage cell in each systolic cycle. Details of the systolic cycle in the spiral cache of the present invention are provided hereinafter below in the section entitled *Systolic Design*. In essence, swap-back and move-forward data arriving at a tile are automatically directed according to the flow patterns described in further detail below. Tiles at edges of the spiral cache array (i.e., the storage cells in the outer turn of the spiral) have any ports that extend toward the outside of the spiral terminated by appropriate circuitry, so that a single tile design can provide all of the functionality of move-to-front and swap backward according to the global clock that provides the systolic pulse operating the spiral cache as described below.

To support the search for and communication of a requested value to front-most tile 1, a second network is provided, a grid-style move-to-front network 116 of next neighbor connections as indicated by the horizontal, vertical and diagonal arrows in FIG. 1. From a high-level perspective the operation of the move-to-front network is straightforward. For example, when processor 100 requests a value that is stored in tile 49, the processor issues the request at front-most tile 1. The request travels along a diagonal path 118 toward (corner) tile 49. The requested value is found in tile 49, and the value (along with the value's address and flags) moves to front-most tile 1 in an xy-routing pattern via tiles 48, 47, 46, 23, 8, in the specified order. Defining P(a, b, c, d ...) as a path of transfer of values from tiles a to b, b to c, c to d, and so forth, it is noted that the travel time along path P(1, 9, 25, 49, 48, 47, 46, 23, 8, 1) involves 10 hops, or 10 cycles according to the spatial memory model described above. The analogous access latency in a linear array of 49 tiles would be $t_{49}=2\times$ 49=98 cycles. Thus, the 2-dimensional spiral organization reduces the access latency approximately according to the square root of the linear access time for an "un-wrapped" spiral. In general, a k-dimensional spiral having N tiles has a worst-case access latency of $\theta(N^{1/k})$. Worst-case access latency as used herein refers to the latency of accessing a tile with the largest Manhattan distance from tile 1.

Geometric Retry A k-dimensional spiral cache with N tiles reduces the worst-case access latency compared to a linear array from $\theta(N)$ to $\theta(N^{1/k})$. The move-to-front heuristic acts to compact the working set at the front of the spiral, and keeps the most frequently accessed data items near front-most tile 1. The above property cannot be exploited with a search strategy that performs a lookup at each tile, because this would require broadcasting each request to the outer boundary of the cache which incurs the worst-case access latency. Instead, the illustrated spiral cache, in accordance with an embodiment of the present invention, implements a search strategy with a best-case access latency of $\theta(1)$ if the request "hits" in (i.e., the requested value is located in) front-most tile 1. Since the values stored in the spiral cache are moved according to the move-to-front placement algorithm described above, processor 100 does not have information specifying a tile where a particular value is stored. Therefore, each access causes a search for the value that corresponds to an address. Rather than look-up the location of the value in a table, such as is typically performed in a conventional associative cache memory, in the spiral cache of the depicted embodiment of the invention, the look-up is performed at each storage cell, by propagating the request to the storage cells, and then returning the requested value from the storage cell at which the requested value is found. According to the assumptions underlying the move-to-front competitiveness result for a linear array given above, a search should scan the tiles from front-most tile 1 towards the tail end of the spiral at backmost tile 49. In a 2-dimensional spiral as illustrated in FIG. 1 the tile array is scanned in a radial fashion. First, a check is performed to determine whether the requested value is stored in front-most storage cell 1. If the value is not located in front-most storage cell 1, the "ring" of radius 2 consisting of tiles 2-9 is checked. If the value is also not found within tiles 2-9, the ring of radius 3 formed by tiles 10-25 is checked and so forth, scanning the tiles on rings with increasing radius. The outward propagating request is handled by the tiles making copies of received requests when the address specified in the requests is not found in the tile. In the present disclosure, the terms "ring" and its "radius" are used loosely, referring to their conformal square maps in the Manhattan layout. However, it is understood that similar concepts apply in layouts that differ from a Manhattan layout and the tiles of the present invention are not limited to use in a particular square layout, or a layout of another shape or necessarily to a spiral arrangement, as the move-to-front and push-backward functionality of a storage tile in accordance with the present invention may be used in other layouts and geometries and have behaviors provided as needed for those geometries in accordance with alternative embodiments of the invention.

Figure 2A:
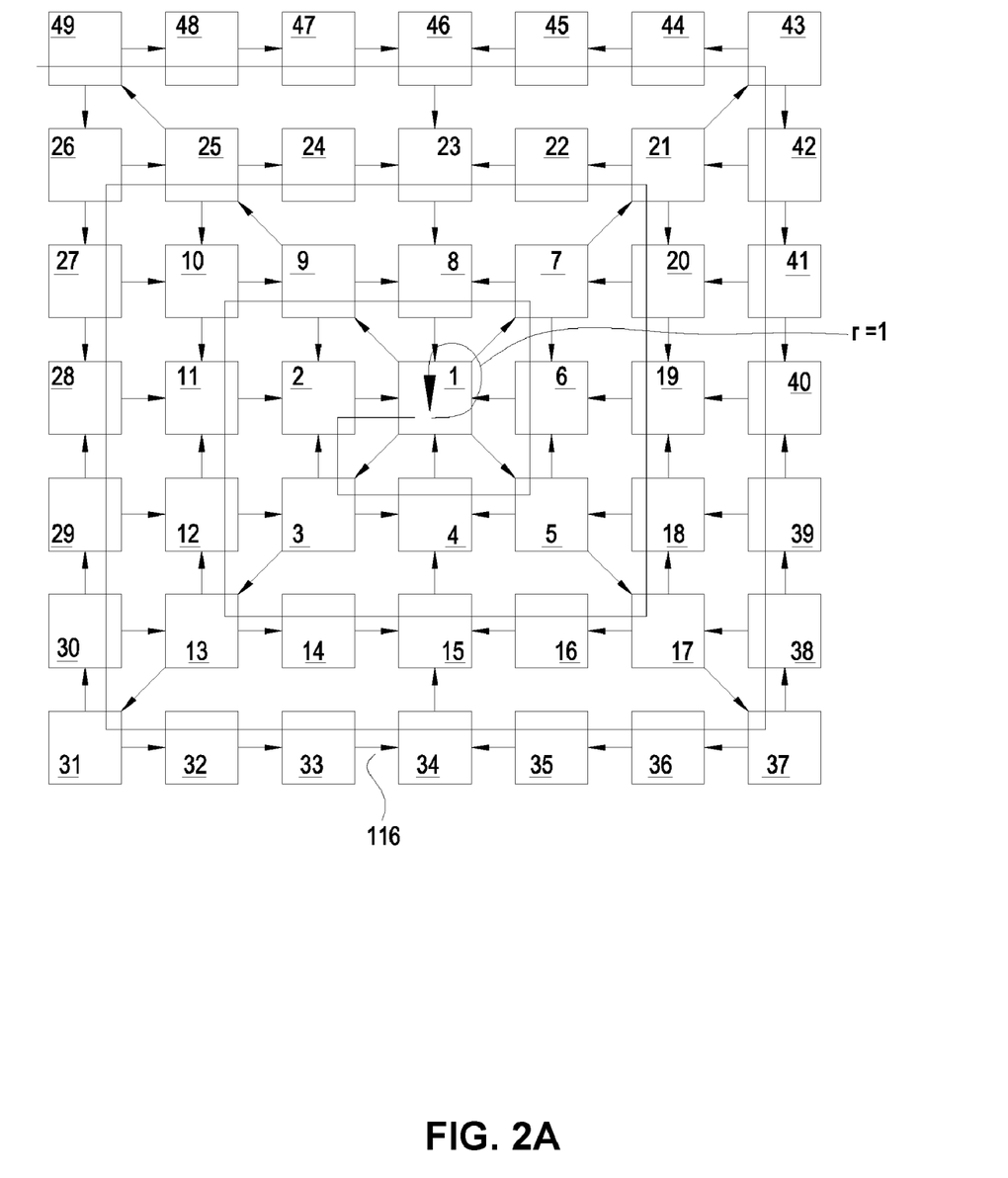
FIGS. 2A-2C are block diagrams illustrating geometric retries within the spiral cache of FIG. 1.
Figure 2B:
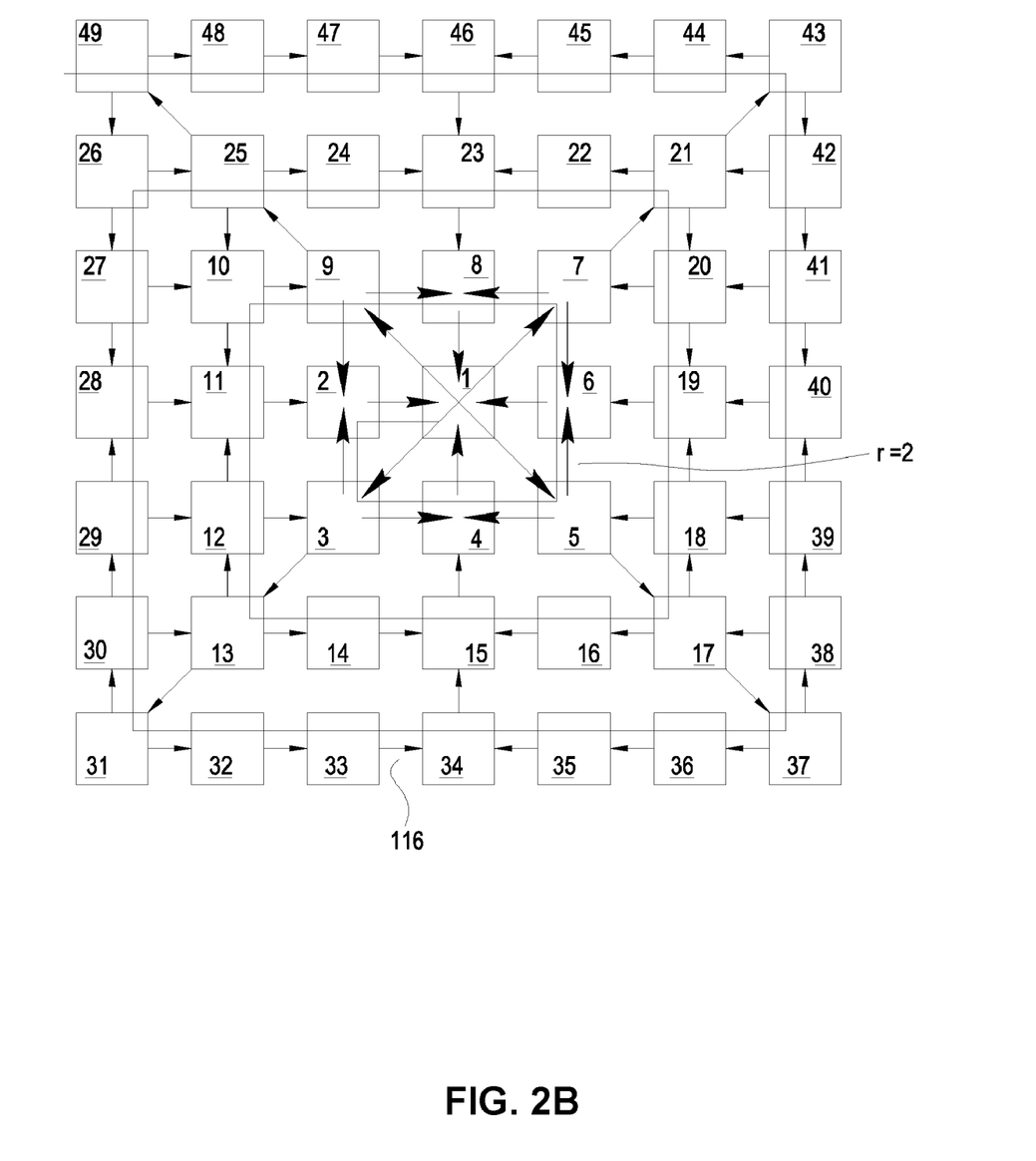
Figure 2C:
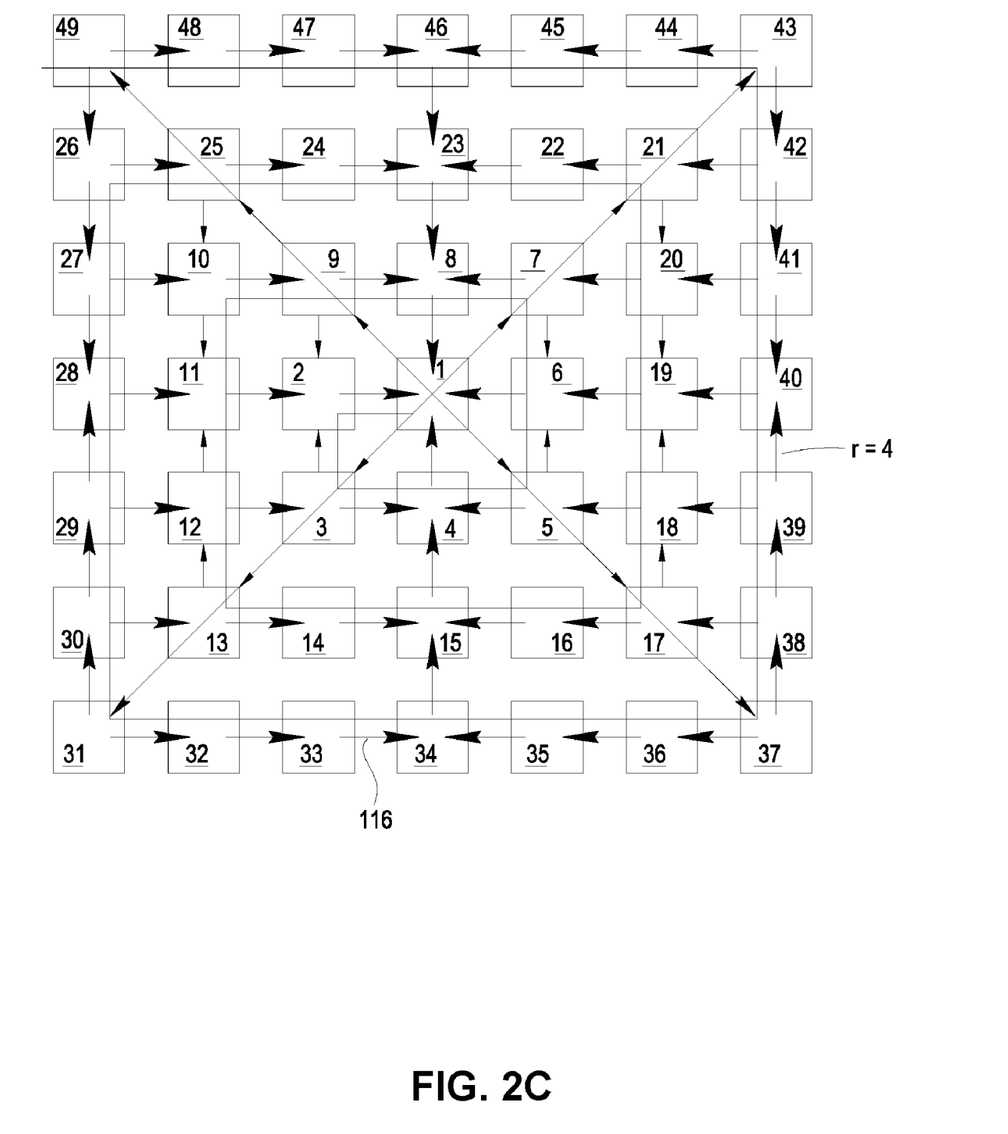

An advantage of the scanning search strategy in the spiral cache illustrated in FIG. 1 is that it produces a best-case access latency of 1 cycle whenever the requested address is found in tile 1. Due to the move-to-front strategy, this best-case scenario should be achieved frequently. One problem encountered in such a scanning search strategy is the unpredictable flow of values that are moving toward front-most tile 1 when multiple access requests are in flight simultaneously. In order to avoid providing internal buffering and flow control mechanisms, which incur an unnecessary circuit area, circuit power and delay penalty, a different search strategy may be employed based on the principle of geometric retry, which is supported by operation of tiles according to an embodiment of the present invention. FIGS. 2A-2C illustrate how the move-to-front network 116 supports a search strategy with geometric retry in accordance with an embodiment of the present invention, which operates according to the following principle: "if an item is not found in the area of radius $2^s$, retry the search in the area with radius $2^{s+1}$." FIG. 2A illustrates the procedure for initial radius $2^0=1$ (r=1), which represents the lookup in front-most tile 1. If the lookup in front-most tile 1 fails, all tiles within radius $2^1=2$, (i.e. (tiles 2-9 for r=2) are searched, and also front-most tile 1 is searched again at radius 1, as illustrated in FIG. 2B. If the search fails again, the search radius is again doubled to $2^2=4$, which covers the entire spiral cache (i.e., tiles 1-49 for r=4) as illustrated in FIG. 2C. If the search of the entire spiral cache fails, the requested value is not in the cache and processor 100 must access backing store 112 to fetch the requested value.

The data flow through the spiral cache during a scanning search is illustrated in FIGS. 2A-2C by the large arrows. The particular search case with retry radius $2^0=1$ is trivial, and retry radius $2^1=2$ is a smaller version of the larger scenario exhibited by retry radius $2^2=4$. The communication pattern for only the top right quadrant in FIG. 2C will be described below, as the other quadrants operate analogously and are searched simultaneously. A central principle of the request data flow in a spiral cache in accordance with the illustrated embodiment of the invention, is that requests can and will be copied, and multiple copies of any given request will be in-flight within the spiral cache array, unless the request is satisfied immediately with a look-up in front-most tile 1. A copy of the request is sent to each of the quadrants on each retry and requests can be further copied within the quadrants, as will be described in further detail below. A request propagates from front-most tile 1 outwards along a diagonal path to tile 43 in the top right corner of the spiral cache. At tile 43, the request is simultaneously sent in a direction leftward in the Figure to tile 44 and downward to tile 42, and therefore two copies of the request are generated from one original copy of the request. The leftward communication path continues until tile 46 is reached, and then turns downward toward front-most tile 1. The downward path is followed until tile 40 is reached, where the request is directed to the left toward front-most tile 1. In each of the tiles on the downward path, a left-directed path is split off by sending a copy of the request to the left. From tile 42, the left-directed path traverses tiles 21 and 22, and is then directed downward at tile 23. From tile 41, the left-directed path traverses tiles 20 and 7, and is directed downward at tile 8. In the above-described path traversal, each tile of the quadrant is visited, and a lookup is performed with the address provided with the request.

The geometric retry employed in the illustrated embodiment does not change the asymptotic bounds due to move-to-front or due to the dimensionality of the spiral. It merely introduces constant factors. More explicitly, the following principles hold:

1. Geometric retry at most doubles the worst-case access latency.
2. Geometric retry succeeds to find an item within a factor of 4 of the scan access latency.

These statements are straightforward to prove and carry over to higher-dimensional spiral caches as well.

Figure 3:
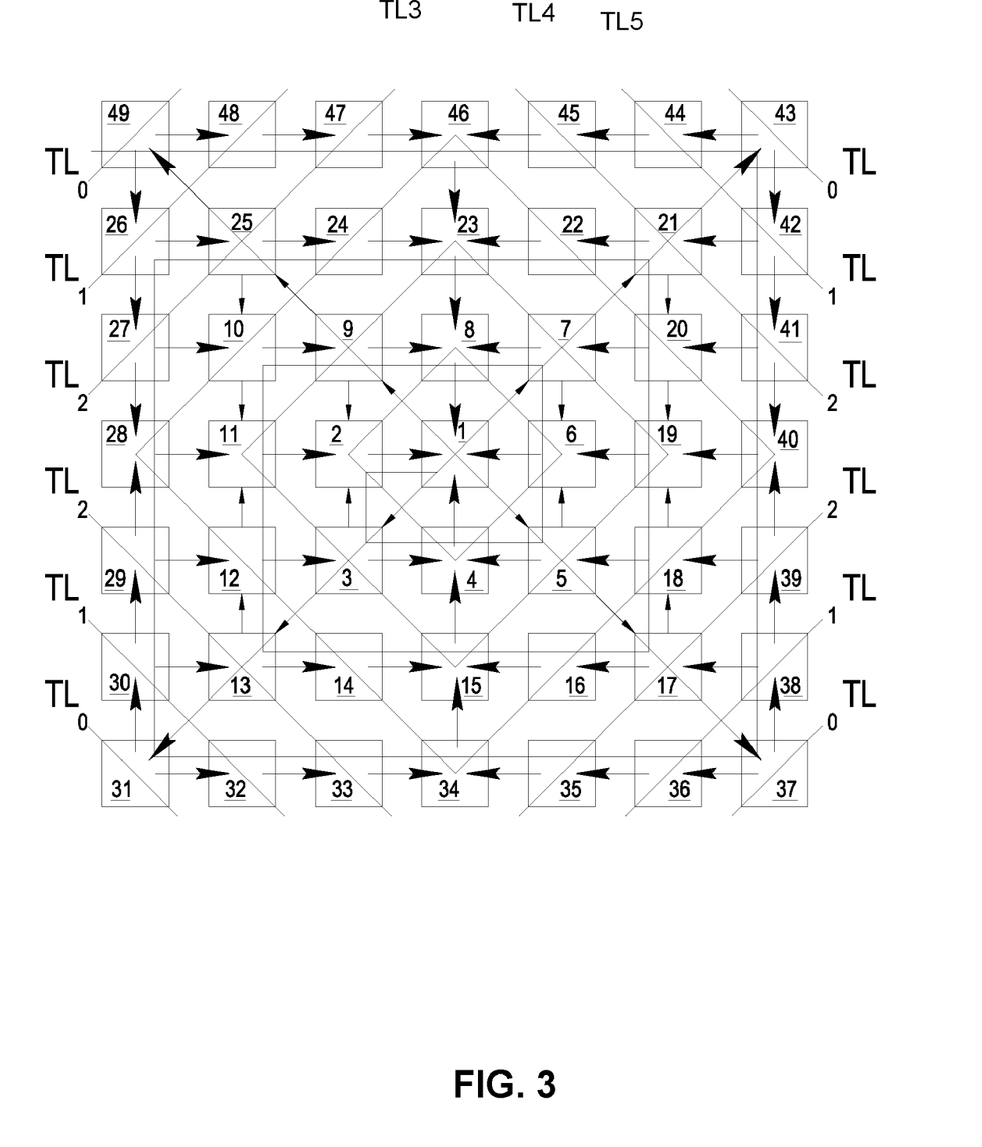
FIG. 3 is a block diagram of the spiral cache of FIG. 1, showing systolic timelines of data flow during operation.

Systolic Design The basic spiral architecture augmented with the geometric retry mechanism can be extended into a systolic architecture in combination with tile behavior in accordance with an embodiment of the invention, to provide both low access latency and high throughput at the same time. A timeline is defined as is a subset of tiles that receive a copy of one request for a particular value (i.e. a request containing one address) at the same time. FIG. 3 shows timelines TL0-TL5 that a request traverses from the corners of the cache boundary towards front-most tile 1. Assuming that a request has travelled along the diagonals to corner tiles 49, 43, 37, and 31, at the leftmost and rightmost boundary tiles, the request is duplicated into a horizontally-directed copy and vertically-directed copy as described above. Assuming that a request reaches the corner tiles during cycle 0, it reaches the tiles specified on the timelines TL1 for cycle 1 next. For example, the request in the top left corner tile 49 reaches tiles 26 and 48 during cycle 1. This communication pattern repeats up to timeline TL3, where multiple incoming requests are present at tiles 46, 40, 34, and 28. Note that the requests arriving at each of these tiles must bear the same address, due to the timing of the requests, the point of generation of request copies and the directing of the requests. Similarly, tiles 23, 8, 1, 4, and 15 operate in a conflict-free manner, because each of multiple incoming requests carries the same address during a cycle, and the tiles pass this address along to the neighboring tile connected to their output. In case of tile 1, the output is the processor.

The above-described data flow is conflict-free because a spiral cache with move-to-front placement stores the data associated with each address in at most one tile. Either the address is not in the spiral cache at all or it is mapped to (and the corresponding value stored in) exactly one tile. Thus, at most one of the requests can "find" data in a tile, and move the retrieved data to front-most tile 1. Each of the tiles having multiple inputs either passes the already retrieved data from one of its inputs to an output directed towards front-most tile 1, or receives the same address on each of the inputs, performs a local lookup, and, in case of a hit, retrieves and passes the data or, in case of a miss, passes the address on to the front-directed output. A systolic data flow enables the pipelining of multiple requests. Each request is sent from front-most tile 1 via the diagonal paths to the corner tiles of the array, and the request moves via timelines TL0-TL5 back to front-most tile 1. Viewing each tile on the diagonal paths and each timeline TL0-TL5 as a pipeline stage, the 7×7 spiral cache in FIG. 3 has effectively 10 stages. The illustrated spiral cache generates a throughput of one request per cycle, and maintains 10 requests in flight. In general, an N×N spiral cache with odd $\lceil N/2 \rceil + 2\lfloor N/2 \rfloor$, or approximately 3/2N, pipeline stages.

To obtain a throughput of one request per cycle in the presence of geometric retry, one additional feature is needed. When a tile on the diagonal receives both of: 1) a new request having a retry radius equal to the diagonal tile's radius; and 2) a returning request on the way back to front-most tile 1 during the same cycle, the returning request must have priority. Otherwise, the systolic pattern of requests traveling along the timelines would be destroyed. Rather than abandoning the new request, it is sent outwards on the diagonal paths with an incremented retry radius. This forwarded request can turn toward the front when it encounters a "bubble" in the pipeline of timelines TL4, TL2 and TL0 on the diagonal tiles. If there is no bubble available, the request will travel to the corners on the boundary, where it is guaranteed by structural and functional design to return without conflict toward the front.

Figure 4:
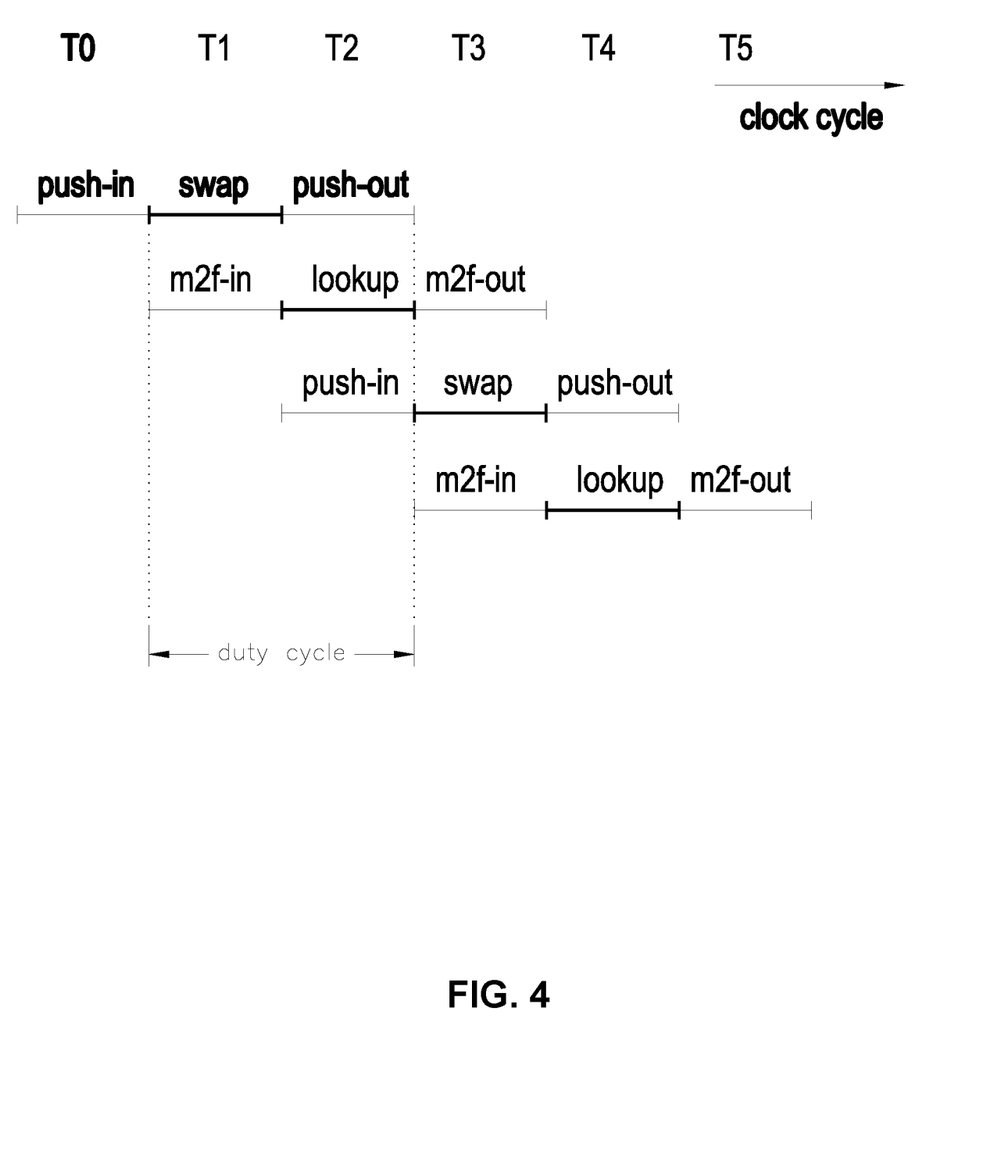
FIG. 4 is a timing diagram illustrating cache micro-operations within the spiral cache of FIG. 1.

In order to perform the above-described operations, the move-to-front and push-back accesses within the tiles must be scheduled. Since the systolic design of the spiral cache in the illustrative embodiment permits one move-to-front lookup operation and one push-back operation per cycle, in a spiral cache in accordance with one embodiment of the present invention, a micro-pipeline with a duty cycle consisting of two clock cycles is included. During the first clock cycle T1, a swap operation swap is performed as part of the push-back functionality, storing input data push-in provided by push-back network 114 and providing the contents of the tile (if non-empty) as output data push-out on push-back network 114. During the second clock cycle T2, a cache lookup lookup is performed to implement the search functionality associated with a request m2f-in moving to the front and moving the request forward on move-to-front network 116 as request m2f-out, populating the data area associated with the request and setting flags if the lookup succeeded. FIG. 4 illustrates the pipelining of cache accesses and next-neighbor communications from the perspective of one tile. A swap operation is incorporated in the illustrative spiral cache tile array design, which: (1) applies the push-back address, (2) reads the cache contents, and (3) writes the push-back data, which can be performed within one clock cycle to meet the two-cycle operation described above, and may include time-borrowing techniques to provide such operation. If a swap operation cannot be practically implemented in a particular design, the swap can be implemented by a one-cycle write operation performed after a one-cycle read operation, and extending the duty cycle of the micro-pipeline to three clock cycles.

Figure 5:
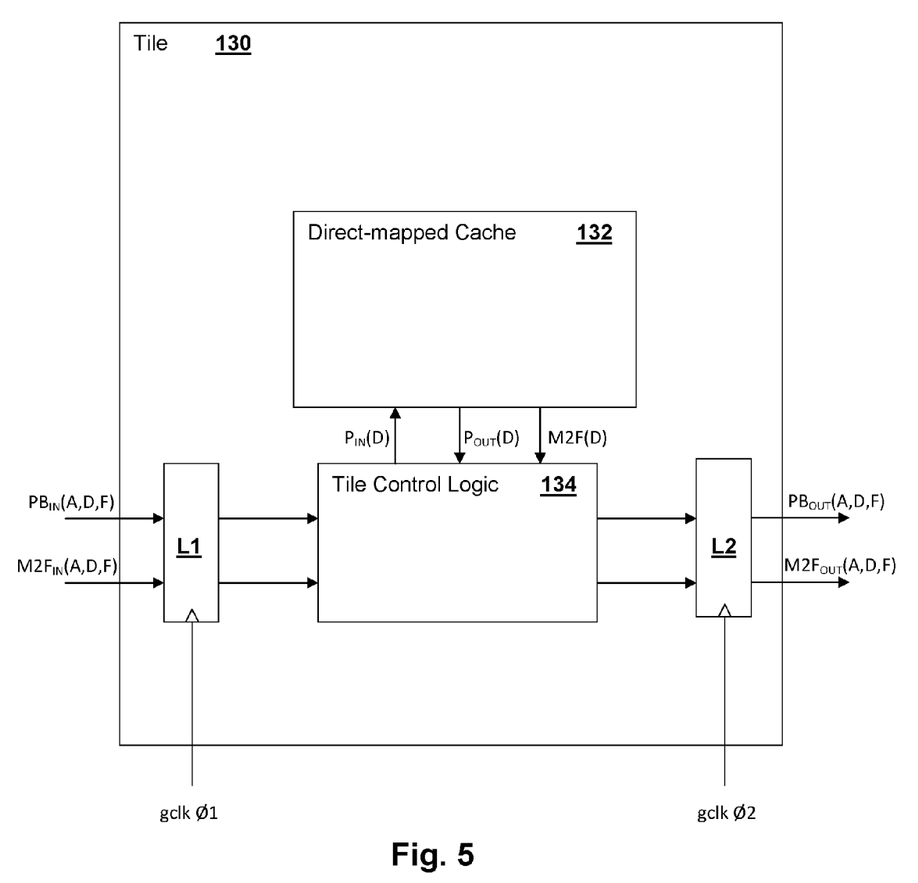
FIG. 5 is a block diagram illustrating a tile in accordance with an embodiment of the present invention, as may be employed within the spiral cache of FIG. 1.

Referring now to FIG. 5, a tile 130 in accordance with an embodiment of the present invention, as may be used to implement each of tiles 1-49 in the spiral cache of FIG. 1 is shown. A direct-mapped cache 132 is managed by a tile control logic 134, which provides the functionality of a cache controller and further provides the functionality to manage the move-to-front and push-backward accesses as described above. While the illustrated embodiment employs a direct-mapped cache, other cache types may be substituted, with the choice of cache types generally being conditioned on providing an access time that substantially matches the wire delay difference between tiles to provide performance benefits as described above. A latch L1 receives the move-to-front input request $M2F_{IN}(A,D,F)$, where parameter list (A,D,F) specifies that the request includes an address (A), a value (D) and flags (F) including the indication of whether the request has been populated with a value (satisfied) as described above. Latch L1 also receives push-back input $PB_{IN}(A,D,F)$ and is clocked by a phase Ø1 of global systolic clock gclk. Tile control logic 134 takes the input values, manipulates direct-mapped cache 132 and provides output values to another latch L2, which provides outputs $M2F_{OUT}(A,D,F)$ and $PB_{OUT}(A,D,F)$ which connect to next-neighbor tiles in their corresponding directions along the spiral to provide the $M2F_{IN}(A,D,F)$ and $PB_{IN}(A,D,F)$ to those tiles as clocked by another phase Ø2 of global systolic clock gclk. As noted above with respect to FIG. 1, each tile has two $M2F_{OUT}(A,D,F)$ output connections which provides copying of requests according to the geometric retry described above and one $PB_{OUT}(A,D,F)$ output connection, which moves the pushed-back data backward along the spiral.

Neighboring tiles are connected according to their position in the spiral cache as shown in FIG. 1, and unused connections of the tiles are impedance terminated to provide proper operation of the array circuit. In general, the depicted interconnects are generally parallel buses with address and data portions. However, other types of interconnect may be provided in accordance with other embodiments of the present invention, since wire delay can be analogized to channel delay for other types of interconnects, generally involving large caches and more distant connections. Flags indicate whether the address portion of the bus corresponds to an active address and whether the data portion of the bus contains valid data. The connections between tile control logic 134 and direct-mapped cache 132 include data input PIN(D), which receives push-back write (swap) data, push-back out $P_{OUT}(D)$, which provides the contents of a previous cache entry when direct-mapped cache 132 is occupied, in response to a received push-back value at push-back input $PB_{IN}(A,D,F)$, and move-to-front data output M2F(D) which provides data if a requested value specified by move-to-front input $M2F_{IN}(A,D,F)$ is present in direct-mapped cache 132. While tile 130 depicts a tile responsive to two phases of a global systolic clock, in general, caches that perform swap operations in one clock cycle are atypical, and another clock phase will be needed by tile control logic 134, occurring between the designated phases Ø1 and Ø2 of global systolic clock gclk, so that the push-back values received at push-back input $PB_{IN}(A,D,F)$ can be stored after retrieving the value stored in direct-mapped cache 132 that will be provided at push-back output $PB_{OUT}(A,D,F)$. The choice of a three-phase clock design versus a cache implementing a swap operation in one clock phase must be considered as to the access delay vs. wire delay considerations mentioned above.

Figure 6:
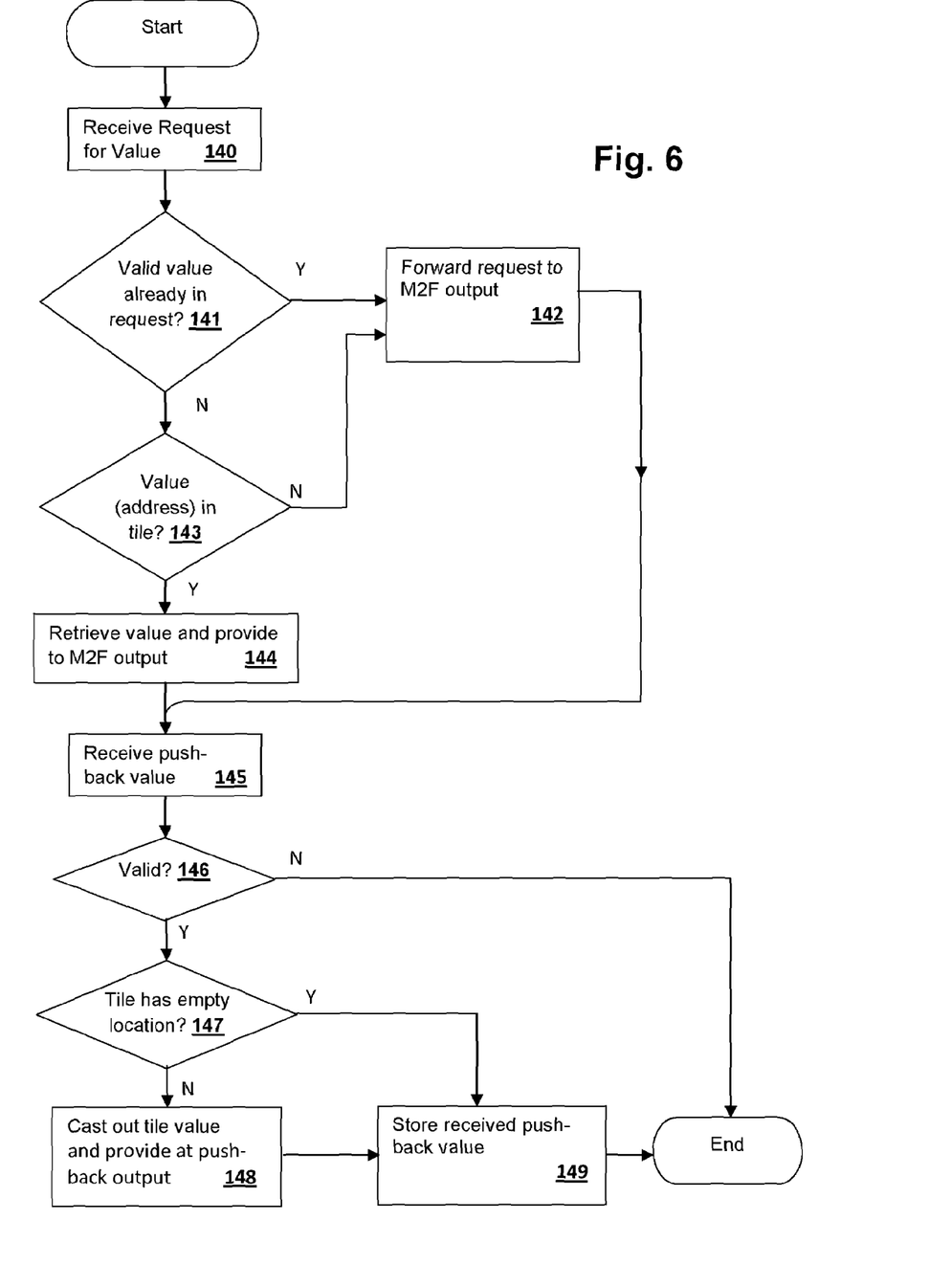
FIG. 6 is a flowchart illustrating operation of tile in accordance with an embodiment of the present invention.

Referring now to FIG. 6, a single flow of a systolic duty cycle through a tile in accordance with an embodiment of the present invention is depicted in a flowchart. For the move-to-front operation, a request is received for a value (step 140) and if a valid value is already in the request received by the tile (i.e., the request was satisfied elsewhere previously) (decision 141), the request is forwarded to the move-to-front output (step 142). Otherwise, if the data is not valid (i.e., the request has not yet been satisfied) (decision 141), the tile storage is checked to see if the requested value is stored in the tile according to the specified address (decision 143). If the requested value is present in the tile (decision 143), the value is retrieved and provided to the move-to-front output (step 144). If the requested value is not present in the tile (decision 143) the request is forwarded to the move-to-front output (step 142), which can use the "hit" indication from the cache to set the "valid" flag in the move-to-front output flags. The tile also receives a push-back input (step 145) and if the push-back data is not valid (decision 146), then no action is taken. Otherwise, if the push-back data is valid (decision 146) and the tile cache does not have an empty location (decision 147), then a value is cast-out from the tile and provided at the push-back output (step 148) and the received push-back value is stored in the freed location (step 149). The above process is repeated at each systolic duty cycle, which maintains move-to-front requests and push-back operations in continuous flow through the tile array.

Figure 7:
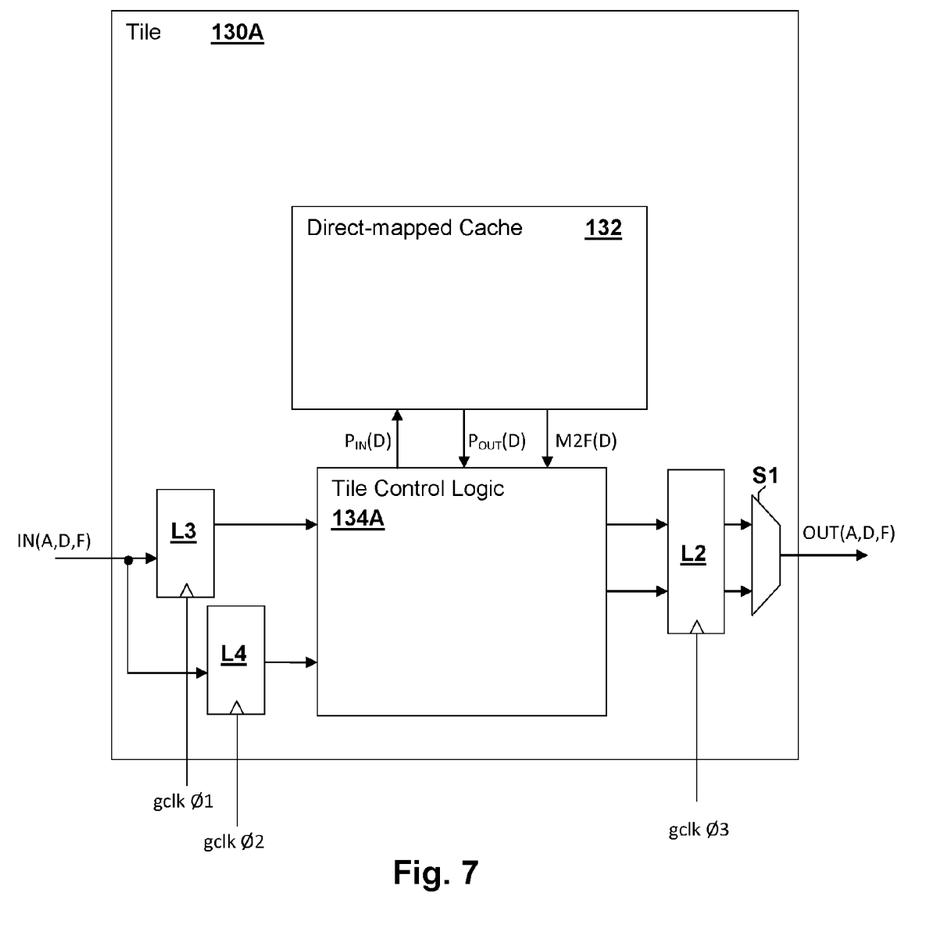
FIG. 7 is a block diagram illustrating a tile in accordance with another embodiment of the present invention, as may be employed within the spiral cache of FIG. 1.

Referring now to FIG. 7, a tile 130A in accordance with another embodiment of the present invention, as may be used to implement tiles 1-49 in the spiral cache of FIG. 1 is shown. Tile 130A is similar to tile 130 of FIG. 5 and therefore only differences between them will be described below. Tile 130A illustrates a tile in which the move-to-front and push-backward connections may be provided on the same port, with an additional clock phase used to separate the operations. As depicted a latch L3 captures an input value IN (A,D,F) according to global clock phase §1 and a latch L4 captures input value IN (A,D,F) according to global clock phase Ø2. During global clock phase Ø1, the push-back values arrive at input IN (A,D,F) and during global clock phase Ø2, move-to-front requests arrive at input IN (A,D,F). Latches L3 and L4 effectively de-multiplex the push-back values and move-to-front requests. Global clock phase Ø3 is used to capture the push-back and move-to-front results from tile control logic 134 at latch L2 and a selector S1 multiplexes the results at a single output OUT(A,D,F) which is connected to the next-neighbor tiles. It is understood that the clocking arrangement depicted in FIG. 7 is simplified in that the wire delay is substantial with respect to the systolic period and therefore the actual phases used to multiplex and de-multiplex the signals for arrival at the next-neighbor cells in proper relation to global clock phases Ø1 and Ø2 may overlap with, or be identical to, one of global clock phases Ø1 and Ø2.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A storage tile for use within a tiled electronic storage array for storing values, the storage tile comprising:
   at least one storage cell for storing one or more of the values;
   at least one input for receiving a request specifying a first address for a first value and receiving a push-back second value and an address of the second value;
   at least one output for providing the first value in response to the request or forwarding the request; and
   control logic responsive to the request such that, if the first value is present in the at least one storage cell, the first value is retrieved from the at least one storage cell and provided at the at least one output and if the first value is not present in the at least one storage cell, a copy of the request is provided at the at least one output, wherein the control logic is further responsive to the push-back second value, such that if one of the at least one storage cell is empty, the push-back second value and the address of the second value are stored, and if the at least one storage cell is full, the second value and the address of the second value are stored in the at least one storage cell and a value from the at least one storage cell is provided at the at least one output along with a corresponding address as a push-back third value and corresponding address.

2. The storage tile of claim 1, wherein the request is a move-to-front request containing an associated value storage field and an indication of whether or not a valid first value is already present in the move-to-front request, and wherein the control logic provides a copy of the request at the at least one output.

3. The storage tile of claim 2, wherein the control logic passes the request to a first next-neighbor tile and to a second next-neighbor tile.

4. The storage tile of claim 1, wherein the at least one storage cell is a cache memory.

5. The storage tile of claim 1, wherein the at least one output comprises two outputs, a first output for providing the first value to a first next-neighbor tile, and a second output for providing the push-back third value to another next-neighbor tile.

6. The storage tile of claim 1, wherein the at least one output comprises a single output, wherein the single output provides the first value to a first next-neighbor tile responsive to a first clock phase of a systolic clock, and provides the second value to a second next-neighbor tile responsive to another clock phase of the systolic clock.

7. The storage tile of claim 1, wherein the at least one input comprises two inputs, a first input for receiving the request for the first value, and the second for receiving the push-back second value.

8. The storage tile of claim 1, wherein the at least one input comprises a single input, wherein the single input receives the request from a first next-neighbor tile during one phase of a systolic clock, and receives the push-back second value from a second next-neighbor tile during another phase of the systolic clock.

9. The storage tile of claim 1, wherein the push-back second value is supplied at the at least one input along within an indication of whether or not the push-back second value is valid, and the control logic stores the push-back second value only if the indication indicates that the push-back second value is valid.

10. A method of operation of a storage tile for use in a storage array, the method comprising:
    first receiving a request specifying a first address for a first value;
    responsive to the request, determining whether or not the first value is present in the storage tile;
    responsive to determining that the first value is present in the storage tile, retrieving the first value from the storage tile and providing the first value at a first output of the storage tile;
    responsive to determining that the first value is not present in the storage tile, providing a copy of the request at the first output of the storage tile;
    second receiving a push-back second value and an address of the second value;
    responsive to the second receiving, determining whether or not the storage tile has an empty location;
    responsive to determining that the storage tile has an empty location, storing the push-back second value and the address of the second value;
    responsive to determining that the storage tile does not have an empty location, retrieving a push-back third value from a location in the storage tile and a corresponding address;
    further responsive to determining that the storage tile does not have an empty location, providing the push-back third value and the corresponding address at a second output of the storage tile; and
    further responsive to determining that the storage tile does not have an empty location, storing the push-back second value in the location previously occupied by the push-back third value.

11. The method of claim 10, wherein the request is a move-to-front request containing an associated value storage field and an indication of whether or not a valid first value is already present in the move-to-front request, and wherein the control logic provides a copy of the request at the at least one output.

12. The method of claim 11, wherein the providing a copy of the request forwards the request to a first next-neighbor tile and to a second next-neighbor tile.

13. The method of claim 10, wherein the storage tile comprises a cache memory.

14. The method of claim 10, wherein the first output and second output are separate outputs, a first output for providing the first value to a first next-neighbor tile, and a second output for providing the push-back third value to another next-neighbor tile.

15. The method of claim 10, wherein the first output and the second output are a single output, wherein the single output provides the first value to a first next-neighbor tile responsive to a first clock phase of a systolic clock, and provides the second value to a second next-neighbor tile responsive to a second clock phase of the systolic clock.

16. The method of claim 10, wherein first receiving and the second receiving receive the request from separate inputs.

17. The method of claim 10, wherein first receiving and the second receiving receive the request from a single input during separate phases of a systolic clock.

18. The method of claim 10, wherein second receiving further receives an indication of whether or not the push-back second value is valid, and the control logic stores the push-back second value only if the indication indicates that the push-back second value is valid.

19. A processing system, comprising:
    a processor for executing program instructions and operating on data values; and
    a cache memory for caching values including at least one of the program instructions or the data values, wherein the cache memory is formed by multiple storage tiles corresponding to a single level of storage access that provides for arbitrary access to any one of the multiple storage elements, wherein values stored within the cache memory are associated with unique corresponding ones of the multiple storage tiles, and wherein the tiles comprise at least one storage cell for storing one or more of the values, at least one input for receiving a request specifying a first address for a first value and receiving a push-back second value and an address of the second value, at least one output for providing the first value in response to the request or forwarding the request, and control logic responsive to the request such that, if the first value is present in the at least one storage cell, the first value is retrieved from the at least one storage cell and provided at the at least one output and if the first value is not present in the at least one storage cell, a copy of the request is provided at the at least one output, wherein the control logic is further responsive to the push-back second value, such that if one of the at least one storage cell is empty, the push-back second value and the address of the second value are stored, and if the at least one storage cell is full, the second value and the address of the second value are stored in the at least one storage cell and a value from the at least one storage cell is provided at the at least one output along with a corresponding address as a push-back third value and corresponding address.

20. The processing system of claim 19, wherein the request is a move-to-front request containing an associated value storage field and an indication of whether or not a valid first value is already present in the move-to-front request, and wherein the control logic provides a copy of the request at the at least one output.

21. The processing system of claim 20, wherein the control logic passes the request to a first next-neighbor and to a second next-neighbor tile.

22. The processing system of claim 21, wherein the at least one storage cell is a cache memory.

23. The processing system of claim 19, wherein the at least one output comprises two outputs, a first output for providing the first value to a first next-neighbor tile, and a second output for providing the push-back third value to another next-neighbor tile.

24. The processing system of claim 19, wherein the at least one input comprises two inputs, a first input for receiving the request for the first value, and the second for receiving the push-back second value.

25. The processing system of claim 19, wherein the push-back second value is supplied at the at least one input along within an indication of whether or not the push-back second value is valid, and the control logic stores the push-back second value only if the indication indicates that the push-back second value is valid.

* * * * *

UNITED STATES PATENT AND TRADEMARK OFFICE
CERTIFICATE OF CORRECTION

PATENT NO. : 8,015,357 B2  
APPLICATION NO. : 12/270186  
DATED : September 6, 2011  
INVENTOR(S) : Strumpen

Page 1 of 2

It is certified that error appears in the above-identified patent and that said Letters Patent is hereby corrected as shown below:

In the Drawings

Delete Sheet 1, and substitute therefor Drawing Sheet consisting of Fig. 3, as shown on attached sheet.

Signed and Sealed this
Fourteenth Day of April, 2015

Michelle K. Lee
*Director of the United States Patent and Trademark Office* fig. 3